US010025553B2

United States Patent
Vilermo et al.

(10) Patent No.: US 10,025,553 B2
(45) Date of Patent: Jul. 17, 2018

(54) METHOD, APPARATUS AND COMPUTER PROGRAM PRODUCT FOR INPUT DETECTION

(71) Applicant: Nokia Technologies Oy, Espoo (FI)

(72) Inventors: Miikka Vilermo, Siuro (FI); Koray Ozcan, Farnborough (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 10 days.

(21) Appl. No.: 14/962,233

(22) Filed: Dec. 8, 2015

(65) Prior Publication Data

US 2016/0188291 A1    Jun. 30, 2016

(30) Foreign Application Priority Data

Dec. 30, 2014    (GB) .................................. 1423344.9

(51) Int. Cl.
| | |
|---|---|
| *G06F 3/16* | (2006.01) |
| *G06F 1/16* | (2006.01) |
| *G06F 3/01* | (2006.01) |
| *H04M 1/725* | (2006.01) |

(52) U.S. Cl.
CPC ............ *G06F 3/167* (2013.01); *G06F 1/1684* (2013.01); *G06F 1/1694* (2013.01); *G06F 3/017* (2013.01); *G06F 3/162* (2013.01); *H04M 1/72569* (2013.01); *G06F 2203/0381* (2013.01); *H04M 2250/74* (2013.01)

(58) Field of Classification Search
CPC ........ G06F 3/162; G06F 3/0346; G06F 3/005; G06F 3/0416; G06F 3/04886; G06F 2203/04108
See application file for complete search history.

(56) References Cited

U.S. PATENT DOCUMENTS

| 8,447,605 | B2 | 5/2013 | Inagaki |
| 2002/0181773 | A1 | 12/2002 | Higaki et al. |
| 2009/0229892 | A1 | 9/2009 | Fisher et al. |

(Continued)

FOREIGN PATENT DOCUMENTS

| EP | 2211337 A1 | 7/2010 |
| WO | 2012/124776 A1 | 9/2012 |

(Continued)

OTHER PUBLICATIONS

Chowdhury et al., "Single Microphone Tap Localization", Thesis, 2013, 72 Pages.

(Continued)

*Primary Examiner* — Shaheda Abdin
(74) *Attorney, Agent, or Firm* — Alston & Bird LLP

(57) ABSTRACT

In an example embodiment, a method, apparatus and computer program product are provided. The method includes determining one or more operating conditions of a device. A selection of a mode of operation of the device from at least a first mode and a second mode is facilitated based on the one or more operating conditions of the device. In the first mode, the device is configured to detect an operation input received from an audio source based on two or more audio sensors of the device. In the second mode, the device is configured to detect the operation input based on at least one of the two or more audio sensors and at least one non-audio sensor of the device.

20 Claims, 6 Drawing Sheets

(56) References Cited

U.S. PATENT DOCUMENTS

| | | | |
|---|---|---|---|
| 2010/0019922 A1 | 1/2010 | Van Loenen et al. | |
| 2010/0128892 A1 | 5/2010 | Chen et al. | |
| 2011/0129105 A1 | 6/2011 | Choi et al. | |
| 2012/0208466 A1* | 8/2012 | Park | G06F 1/1601 455/41.3 |
| 2012/0309412 A1* | 12/2012 | MacGougan | G06F 3/0346 455/456.1 |
| 2012/0316456 A1* | 12/2012 | Rahman | G06F 1/163 600/547 |
| 2014/0355772 A1 | 12/2014 | Liu | |

FOREIGN PATENT DOCUMENTS

| | | |
|---|---|---|
| WO | 2013/105805 A1 | 7/2013 |
| WO | 2014/024009 A1 | 2/2014 |
| WO | 2014/088162 A1 | 6/2014 |

OTHER PUBLICATIONS

"Sonic Ranging and Locating—Small Scale", Roman Black, Retrieved on Nov. 26, 2015, Webpage available at : http://www.romanblack.com/SonicRanging/Sonic_Ranging.htm.

"Microphone Turns Any Surface Into a Multitouch Interface", Extreme Tech, Retrieved on Nov. 26, 2015, Webpage available at : http://www.extremetech.com/extreme/111847-microphone-turns-any-surface-into-a-multitouch-interface.

"Acoustic Tablet", Wikipedia, Retrieved on Nov. 26, 2015, Webpage available at : https://en.wikipedia.org/wiki/Acoustic_tablet.

"Qualcomm's Ultrasonic Pen Demo Transcribes From Paper to Device (Video)", Engadget, Retrieved on Nov. 26, 2015, Webpage available at : http://www.engadget.com/2011/02/15/qualcomms-ultrasonic-pen-demo-transcribes-from-paper-to-device/.

U.S. Appl. No. 14/459,747, "User Interaction With an Apparatus Using a Location Sensor and Microphone Signal(S)", filed Aug. 14, 2014, 29 Pages.

Lopes et al., "Augmenting Touch Interaction Through Acoustic Sensing", Proceedings of the ACM International Conference on Interactive Tabletops and Surfaces, Nov. 13-16, 2011, pp. 53-56.

"Multilateration", Wikipedia, Retrieved on Nov. 26, 2015, Webpage available at : http://en.wikipedia.org/wiki/TDOA.

Kim et al., "Accurate Position Detection of Sound Source by LabView", Proceedings of 20th International Congress on Acoustics, Aug. 23-27, 2010, pp. 1-4.

Search Report received for corresponding United Kingdom Patent Application No. 1423344.9, dated Jul. 1, 2015, 3 pages.

\* cited by examiner

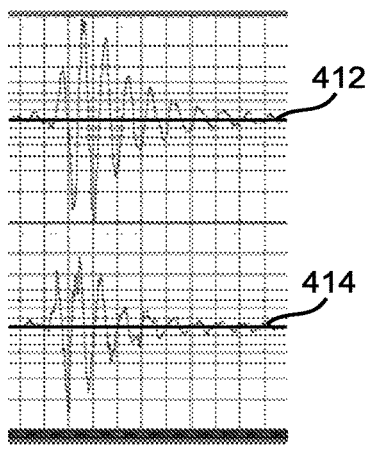 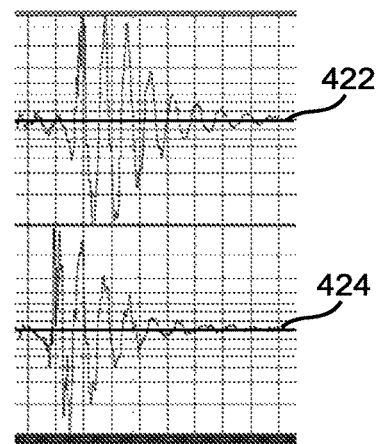
FIGURE 4A  FIGURE 4B
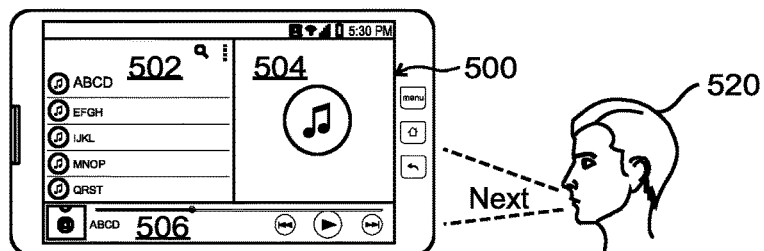
FIGURE 5A
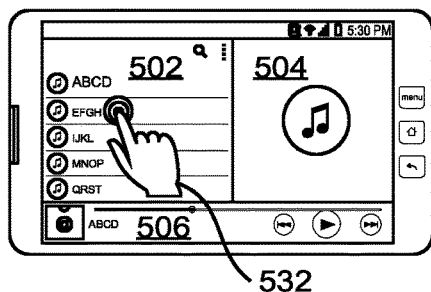
FIGURE 5B
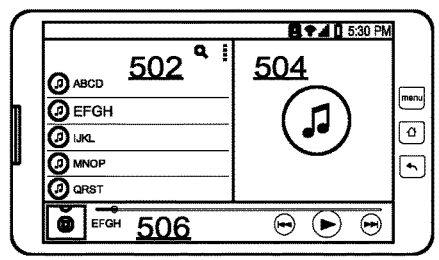
FIGURE 5C

METHOD, APPARATUS AND COMPUTER PROGRAM PRODUCT FOR INPUT DETECTION

TECHNICAL FIELD

Various implementations relate generally to method, apparatus, and computer program product for input detection at a device.

BACKGROUND

Various devices are being developed that provides users with opportunities to explore various applications. The users interact with the devices for a multitude of purposes such as accessing multimedia content stored on the devices, recording/capturing new multimedia content, enabling communication with other devices and so on. Examples of such devices include, but are not limited to, cameras, mobile phones, and other multimedia devices.

Due to increase in user interaction with the devices, various ways and means are provided for enabling the user interaction in a convenient manner. For example, interaction means such as gesture based, touch based, audio based interaction, and so on, have been introduced. These interaction means also enable a single-handed operation of the devices. Moreover, due to ease of operation of the devices by employing various interaction means, the users may use the devices for an increasing number of activities including, but not limited to, communication, accessing multimedia content, browsing over World Wide Web, during activities such as exercising, snowboarding, and so on. Additionally, with emergence of wearable computing peripheral devices, such as smart glass and smart watch, that are operable by the devices, the use of the devices in various day-to-day activities has also increased.

The above mentioned means of interacting with the devices are enabled by, for example, a variety of sensors being embodied in a device. For example, a touch based input to the device may be enabled/detected by one or more touch sensors embodied in the device. However, in various instances the sensors may be insufficient in number to accurately detect the input provided to the device, or in certain instances one or more sensors may not be configured to operate in those directions from where the input is being provided by an input source or some sensor don't operate well in some operating conditions.

SUMMARY OF SOME EMBODIMENTS

Various example embodiments are set out in the claims.

In a first embodiment, there is provided a method comprising: determining one or more operating conditions of a device; and facilitating selection of a mode of operation of the device from at least a first mode and a second mode based on the one or more operating conditions of the device, wherein in the first mode, the device is configured to detect an operation input from an audio source based on two or more audio sensors of the device, and wherein in the second mode, the device is configured to detect the operation input based on at least one of the two or more audio sensors and at least one non-audio sensor of the device.

In a second embodiment, there is provided an apparatus comprising: at least one processor; and at least one memory comprising computer program code, the at least one memory and the computer program code configured to, with the at least one processor, cause the apparatus to at least perform: determine one or more operating conditions of a device; and facilitate selection of a mode of operation of the device from at least a first mode and a second mode based on the one or more operating conditions of the device, wherein in the first mode, the device is configured to detect an operation input at the device from an audio source based on two or more audio sensors of the device, and wherein in the second mode, the device is configured to detect the operation input based on at least one of the two or more audio sensors and at least one non-audio sensor of the device.

In a third embodiment, there is provided a computer program product comprising at least one computer-readable storage medium, the computer-readable storage medium comprising a set of instructions, which, when executed by one or more processors, cause an apparatus to at least perform: determining one or more operating conditions of a device; and facilitating selection of a mode of operation of the device from at least a first mode and a second mode based on the one or more operating conditions of the device, wherein in the first mode, the device is configured to detect an operation input from an audio source based on two or more audio sensors of the device, and wherein in the second mode, the device is configured to detect the operation input based on at least one of the two or more audio sensors and at least one non-audio sensor of the device.

In a fourth embodiment, there is provided an apparatus comprising: means for determining one or more operating conditions of a device; and means for facilitating selection of a mode of operation of the device from at least a first mode and a second mode based on the one or more operating conditions of the device, wherein in the first mode, the device is configured to detect an operation input from an audio source based on two or more audio sensors of the device, and wherein in the second mode, the device is configured to detect the operation input based on at least one of the two or more audio sensors and at least one non-audio sensor of the device.

In a fifth embodiment, there is provided a computer program comprising program instructions which when executed by an apparatus, cause the apparatus to: determine one or more operating conditions of a device; and facilitate selection of a mode of operation of the device from at least a first mode and a second mode based on the one or more operating conditions of the device, wherein in the first mode, the device is configured to detect an operation input from an audio source based on two or more audio sensors of the device, and wherein in the second mode, the device is configured to detect the operation input based on at least one of the two or more audio sensors and at least one non-audio sensor of the device.

BRIEF DESCRIPTION OF THE FIGURES

Various embodiments are illustrated by way of example, and not by way of limitation, in the figures of the accompanying drawings in which:

FIGS. 4A-4B illustrates example waveforms representative of signals being received at two audio sensors of a device in various orientations of the device, in accordance with example embodiments;

FIGS. 5A-5C illustrates operations at an example user interface of a device for detecting input at the device, in accordance with example embodiments;

DETAILED DESCRIPTION

Example embodiments and their potential effects are understood by referring to FIGS. 1 through 11 of the drawings.

Figure 1:
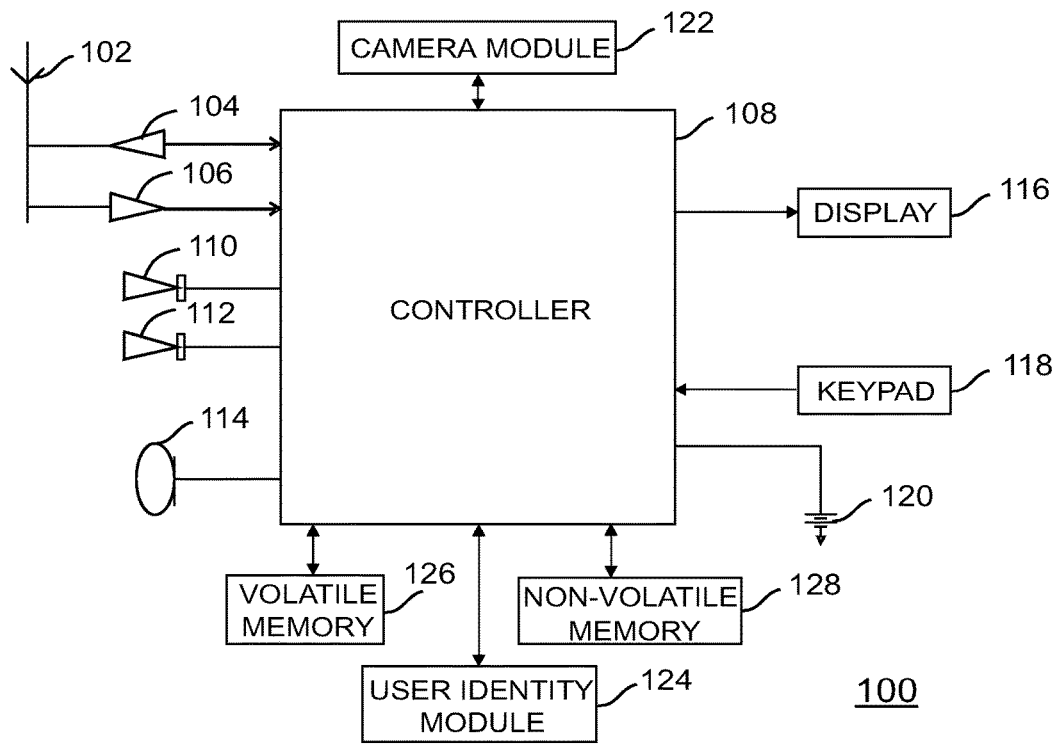
FIG. 1 illustrates a device, in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices and wearable devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and the receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
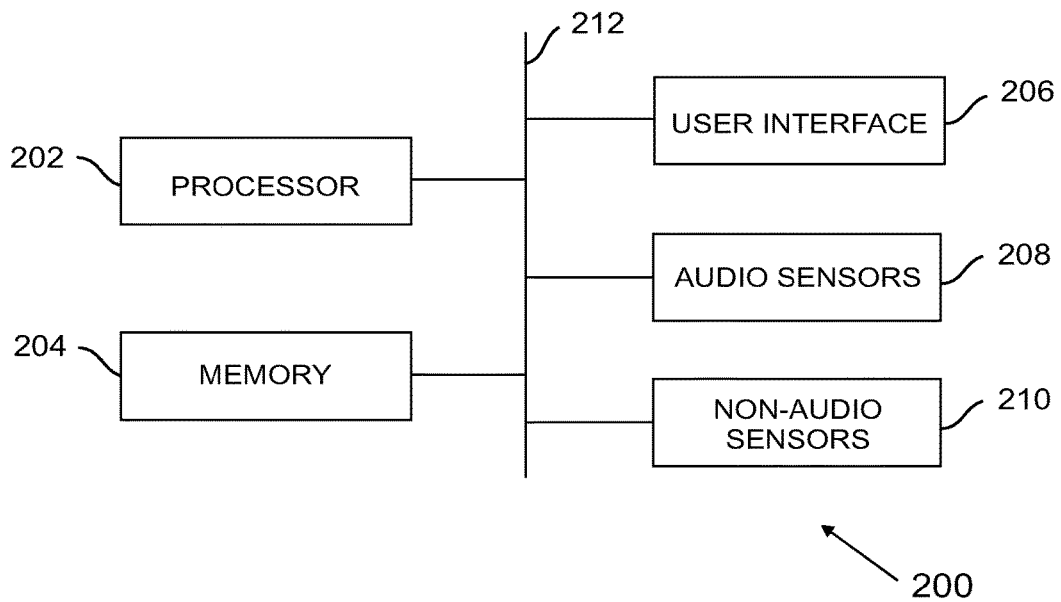
FIG. 2 illustrates an apparatus for input detection, in accordance with an example embodiment.

FIG. 2 illustrates an apparatus 200 for input detection, in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may be embodied in a device such as communication device, media capturing device with or without communication capabilities, computing devices, and the like. Some examples of the communication device may include a mobile phone, a personal digital assistant (PDA), and the like. Some examples of computing device may include a laptop, a personal computer, and the like. In an example embodiment, the device may include a user interface, for example, the user interface (UI) 206, having user interface circuitry and user interface software configured to facilitate a user to control at least one function of the device through use of a display and further configured to respond to user inputs. In an example embodiment, the device may include a display circuitry configured to display at least a portion of the user interface 206 of the device. The display and display circuitry may be configured to facilitate the user to control at least one function of the device.

In an example embodiment, the device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus 200 or circuitry to perform the functions of the transceiver. The transceiver may be configured to receive media content. Examples of the media content may include audio content, video content, data, and a combination thereof.

In an example embodiment, the device is embodied to include two or more audio sensors (such as audio sensors 208) and at least one non-audio sensor (such as at least one non-audio sensor 210). The two or more audio sensors 208 and the at least one non-audio sensor 210 are utilized for detecting operation input being received at the apparatus 200. In an example embodiment, the plurality of audio sensors 208 includes microphones. A microphone is an acoustic-to-electrical transducer that may be configured to convert sound energy (of an audio signal) into an electrical signal. In an example embodiment, one or more microphone sensors receives/senses an audio input from audio sources located in close proximity of the apparatus 200. In an example embodiment, an audio source is a pre-registered audio source, meaning thereby that the audio source is registered with the apparatus 200 and is configured to provide the operation input to the apparatus 200. For example, the audio source can be tap/click by user's fingers or any other object on a surface in close proximity to the apparatus 200, where the apparatus 200 can be pre-configured to receive the operation input in form of tap/click by objects or user's fingers located in a close proximity of the apparatus 200. In an example embodiment, the plurality of microphones is configured at a plurality of distinct locations on the apparatus 200. In an example embodiment, the plurality of microphones are configured to receive audio signal generated from different directions relative to the apparatus 200 such as front, back, left, right and so on. Various examples illustrating positions of the plurality of microphones being configured in the apparatus 200 are illustrated and explained further with respect to FIGS. 3A-3C.

The at least one non-audio sensor 210 includes one or more of at least one image sensor, at least one hover sensor, at least one touch sensor, and the like. In an example embodiment, the at least one image sensor is configured for to capture multimedia content. The at least one image sensor is in communication with the processor 202 and/or other components of the apparatus 200. The at least one image sensor is in communication with other imaging circuitries and/or software, and is configured to capture digital images or to make a video or other graphic media files. The at least one image sensor and other circuitries, in combination, may be an example of at least one camera module such as the camera module 122 of the device 100. The at least one image sensor is used to implement imaging functions that include, but are not limited to, high dynamic range imaging, optical feature detection, and object recognition using appearance matching, as compared to a traditional camera.

These components (202-210) may communicate to each other via a printed circuit board (PCB) 212 to facilitate detection of the operation input at the apparatus 200. In an example embodiment, the PCB 212 may be directly or indirectly connected to the components (202-210). In some embodiments, the PCB 212 may include a flexi-board (or flexible terminal) or a secondary PCB that may be connected to a main PCB. In certain embodiments, the PCB 212 may be a central printed circuit board (PCB) such as a motherboard, main board, system board, or logic board.

In an example embodiment, a device (such as the device 100) embodying the apparatus 200 may be operated by means of the operation input, for example, directional audio commands being provided as input to the device. The operation input facilitates users in interacting with the device. Operation inputs may be received from the audio source located in a close proximity to the device. For example, the audio sources may include, but are not limited to, a user action such as tapping action, a stylus touch on a surface, clapping of hands, clicking of fingers, user voice, and the like. The audio sources may be pre-registered with the device so that the device can identify the operation inputs being received from the pre-registered audio sources. The device may include various means for determining direction of the audio source and/or a relative position of the audio source with respect to the device. The direction of the audio source relative to the device is determined since the device is configured to receive the operation inputs such as audio commands from directions belonging to a set of predetermined directions. In an example embodiment, the apparatus 200 may include various means for detecting direction of the operation inputs being input to the device. Examples of such means may include, but are not limited to, audio sensors such as microphones.

In an example embodiment, in one or more operating conditions of the device, the device is not able to detect the operation inputs such as directional audio commands. For example, in some scenarios, the device may be oriented in such a position that the device is not able to detect the directional audio commands being received at the device. In some other scenarios, the operating conditions of the device are not suitable to detect the directional audio commands because of a high level of ambient noise associated with the device. In some other scenarios, the device is operating in an environment where motion level of the device is too high. For instance, when a user of the device is indulged in a high motion activity such as jogging, the device is associated with a motion level that is not suitable for direction determination of audio commands.

In an example embodiment, the apparatus 200 may be caused to determine the one or more operating conditions, and based on said determination, the apparatus 200 may be caused to facilitate selection of a mode of operation of the device that may be appropriate to detect an operation input at the device. In an example embodiment, the apparatus 200 may include a means such as a processing means for facilitating selection of the mode of operation of the device for detecting the operation input at the device. In an example embodiment, the processing means may facilitate selection of the mode of operation of the device based on a user input. For example, the processing means can facilitate a user to provide the user input for selecting at least one of a first mode and a second mode for operating the device upon determination of one or more operating conditions of the device. In another example embodiment, the processing means can provide selection of the mode of operation of the device based on the one or more operating conditions of the device. For example, the processing means can automatically select the at least one of the first mode and the second mode for operating the device upon determination of the one or more operating conditions of the device. The detection of the operation input at the device may facilitate a user in interacting with the device. In response to the determination of the one or more operating conditions of the device, the device can operate in at least the first mode of operation and the second mode of operation. In the first mode of operation, the device detects the operation input by using the two or more audio sensors. In some scenarios, the device is not able to detect the operation input due to the one or more operating conditions of the device. In such scenarios, the device operates in the second mode of operation, where the device detects the operation inputs to the device by using at least one non-audio sensor and at least one of the two or more audio sensors. In an example embodiment, the modes such as the first mode and the second mode are configured as switchable modes based on the detection of the one or more operating conditions of the device by the apparatus 200. In some embodiments, the switching of the modes of operation, for example from the first mode to the second mode and vice-versa, can be performed at least in parts or under certain circumstances in an automated manner. Alternatively, the switchable modes may be configured by the user based on the determination of the one or more operating conditions by the user.

In an example embodiment, the processor 202 is configured to, with the content of the memory 204, and optionally with other components described herein, to cause the apparatus 200 to determine the one or more operating conditions of the device. For example, the apparatus 200 may include means such as at least one audio sensor for detecting an ambient noise level associated with the device to be greater than or equal to a predetermined threshold level of noise. In an example embodiment, the predetermined threshold level of noise may define a level of ambient noise beyond which the audio command may not be suitably detected by the audio sensors at the apparatus 200. On detecting the ambient noise level to be greater than or equal to the predetermined threshold level of noise, the apparatus 200 causes the device to operate in the second mode. In an example embodiment, the apparatus 200 includes means such as processing means for facilitating selection of the second mode of operation for operating the device. In the second mode of operation, the device is caused to detect the operation input to the device by using at least one of the two or more audio sensors and at least one non-audio sensor. Alternatively, the device is caused to detect the operation input to the device by using at least one non-audio sensor. For example, the device can detect the operation input by using only a non-audio sensor such as a hover sensor. In an example, a UI such as the UI 206 may be configured to display the enablement of the second mode for detection of the operation input. An example of the UI 206 displaying the enablement of the second mode is described further with reference to FIG. 6A.

In case, the ambient noise level associated with the device is determined to be less than the predetermined threshold level of noise, the apparatus 200 is caused to facilitate selection of the first mode of operation for operating the device. In the first mode, the device detects the operation inputs such as the directional audio commands by using the two or more audio sensors. In an example embodiment, the apparatus 200 may include a means, such as a processing means, for facilitating selection of the at least the first mode and the second mode of operation for operating the device based on the comparison of the ambient noise level with the predetermined threshold level of noise. An example of the processing means may include the processor 202, which may be an example of the controller 108. An example method for input detection based on the determination of the ambient noise level is explained further in detail with reference to FIG. 9.

In another example embodiment, the processor 202 is configured to, with the content of the memory 204, and optionally with other components described herein, to cause the apparatus 200 to determine the one or more operating conditions of the device based on the motion level of the device. For instance, in case a user of the device is indulged in a high motion activity such as jogging, then the device is associated with the motion level that is not suitable for direction determination of audio commands. In such a scenario, the motion level (or the shakiness) of the device can be determined to be greater than or equal to a predetermined threshold level of motion. On determination of the motion level of the device to be greater than or equal to the predetermined threshold level of motion, the apparatus 200 is caused to facilitate the selection of the second mode of operation for operating the device. In an example embodiment, the apparatus 200 includes means such as processing means for selecting the second mode of operation for operating the device. As discussed before, in the second mode of operation for operating the device, the apparatus 200 is caused to detect the operation input to the device by using the at least one of the two or more audio sensors and the at least one non-audio sensor, such as hover sensor, image sensor, touch sensor, and so on. Alternatively, the device is caused to detect the operation input to the device by using at least one non-audio sensor. For example, the device can detect the operation input by using only a non-audio sensor such as a touch sensor. If however, the motion level associated with the device is determined to be less than the predetermined threshold level of motion, the first mode of operation is selected for operating the device, in which the device utilizes the audio sensors for detecting the operation input. In an example embodiment, the apparatus 200 includes means such as a processing means for facilitating selection or providing selection of at least the first mode and the second mode of operation for operating the device based on the determination of the motion level. An example of the processing means may include the processor 202, which may be an example of the controller 108. In an example embodiment, the apparatus 200 may indicate enablement of the second mode by means of a UI, for example the UI 206. An example of UI 206 displaying the enablement of the second mode is described further with reference to FIG. 6C. Also, an example method for input determination in case of a high motion level of the device is explained further in detail with reference to FIG. 10.

In yet another example embodiment, the processor 202 is configured to, with the content of the memory 204, and optionally with other components described herein, to cause the apparatus 200 to determine the one or more operating conditions of the device based on a determination of the motion level and the ambient noise level associated with the device. For example, the apparatus 200 is caused to detect the ambient noise level associated with the device to be greater than or equal to the predetermined threshold level of the ambient noise and the motion level to be greater than or equal to the predetermined threshold level of the motion level. An example scenario involving the ambient noise level being greater than or equal to the predetermined threshold level of noise, and the motion level being greater than the predetermined threshold level of the motion level, may be when an acceleration of the apparatus 200 is strong and random, for example, in case when the user holding the apparatus 200 (or a device embodying the apparatus 200) is indulged in a high motion activity such as running, dancing, and so on. In such a scenario, the apparatus 200 may be caused to facilitate selection of the second mode of operation for operating the device, wherein the apparatus 200 utilizes at least one of the two or more audio sensors and at least one non-audio sensor for detecting the operation inputs received at the device. Alternatively, the device is caused to detect the operation input to the device by using at least one non-audio sensor. For example, the device can detect the operation input by using only a non-audio sensor such as a hover sensor. In an example embodiment, the apparatus 200 may include a means such as a processing means for facilitating the selection from the at least first mode and the second mode of operation for operating the device based on the comparison of the noise level with the predetermined threshold level of noise, and the comparison of the motion level with the predetermined threshold level of motion. An example of the processing means may include the processor 202, which may be an example of the controller 108. In an example embodiment, the apparatus 200 may indicate enablement of the second mode by means of a UI, for example the UI 206. An example of the UI 206 displaying the enablement of the second mode is described further with reference to FIG. 6C. Also, an example method for input detection based on the determination of high levels of motion and the ambient noise associated with the device, is explained further in detail with reference to FIG. 11.

In still another example embodiment, the apparatus 200 is caused to determine the one or more operating conditions of the device based on a determination of the direction of the operation input such as the directional audio commands received at the device. For example, the apparatus 200 includes means such as processing means that along with the memory means may be configured to determine the one or more operating conditions of the device based on the determination of the direction of the operation input. Since the apparatus 200 is configured to detect the operation inputs being received from a set of predetermined directions only, the apparatus 200 may not be able to detect the operation input received from directions other than the set of predetermined directions. In case the direction of the operation input being received at the device is determined to be corresponding to a unique direction or from among the set of predetermined directions, the device (embodying the apparatus 200) operates in the first mode and accordingly can detect the operation input by using the plurality of audio sensors. If, however, the determined direction is not corresponding to a unique direction or is not from among the set of predetermined directions, the device may be switched to operate in the second mode of operation, in which the device may detect the operation input by using the at least one non-audio sensor and the at least one audio sensor. Herein, the set of predetermined directions may include those directions that may be mapped with corresponding actions, by the apparatus 200. In an example, an operation input detected in any predetermined direction facilitates the apparatus 200 to perform the corresponding action being mapped for that direction. In an example scenario, the set of predetermined directions may include two or more directions from among a plurality of directions such as left direction, right direction, front direction and back direction. In an example embodiment, the set of predetermined directions for a particular device orientation depends on a relative configuration of the plurality of audio sensors 208 with respect to the apparatus 200. It will be understood that the set of predetermined directions includes fewer or more number of directions associated with the apparatus 200, without limiting the scope of the embodiments described herein. In an example embodiment, the set of predetermined directions can be defined corresponding to the orientation of the apparatus 200. For example, corresponding to a portrait orientation, the predetermined directions includes "left", "right", "front", and "back". In an example embodiment, the sounds/audio signal coming from these predetermined directions may arrive at the different times at two or more audio sensors, and therefore the apparatus 200 can utilize audio sensor signals to detect the operation input.

For example, on detecting that the direction of an audio input relative to the apparatus 200 is not among one of the predetermined directions, the apparatus 200 may be caused to enable at least one of a hover sensor, an image sensor, a touch sensor or a combination of any of the non-audio sensors 210. In an example embodiment, the apparatus 200 may include means such as processing means that may be caused to determine whether the at least one non-audio sensor 210 detected a non-audio input at the same time when the audio input is detected by the at least one audio sensor at the apparatus 200. For example, the apparatus 200 may detect whether an activity at a non-audio sensor, for instance a touch activity at the at least one touch sensor, is detected at the same time when the input is detected at the audio sensors. Based on the detection that the activity at the non-audio sensor is performed at the same time when the input is detected at the audio sensors, the apparatus 200 is caused to detect the direction of the operation input which may be an audio command. For instance, if a touch sensor is touched on the left side of the device, the audio input direction may be detected as "left" direction, and in case a touch sensor is touched on the right side of the device, the audio input direction is detected as "right" direction.

In another example embodiment, the at least one non-audio sensors 210 may include a hover sensor. The hover sensor determines whether a hover motion by, for example a hand is detected at the same time when the command at the audio sensors is detected. For instance, if the hover sensor detects a hover motion at a "left" side of the device, the audio command direction is detected as "left" direction, and in case the hover sensor detects the hover motion on the right side of the device, the audio command direction is detected as the "right" direction. In an example embodiment, the hover motion is assumed to be produced by the user's hand. In an example embodiment, the apparatus 200 may detect the hover motion being produced by that hand of user which is not utilized for holding the apparatus 200.

In yet another example embodiment, the at least one non-audio sensor 210 includes image sensors. In an example embodiment, the image sensors are embodied in a camera module, for example the camera module 122 (FIG. 1). In an example embodiment, the image sensors determine, based on the images captured by the camera, the position of user's hand at the time of detection of the audio command received at the device. In an example embodiment, the apparatus 200 detects whether an activity at the image sensor, for instance image captured at the image sensor, is detected at the same time when the audio input is detected at the audio sensors 208. Based on the detection that the activity at the non-audio sensor 210 is performed at the same time when the audio input is detected at the audio sensors, the apparatus 200 is caused to detect the direction of the operation input which can be an audio input. In an example embodiment, the image sensor captures an image of the hand of the user and detect the activity/motion associated with the user's hand at the time when the audio input is detected at the at least one audio sensor. In an example embodiment, based on the image being captured for user's hand, the direction of the operation input is determined. In an example embodiment, the motion of the user's hand is assumed to be produced by that hand which is not utilized for holding the apparatus 200.

As described in the foregoing embodiment, the determination of direction of the operation input facilitates in determining the mode of operation of the device. In an example embodiment, the direction of the operation inputs is determined based on a position of the audio source relative to the device and/or the orientation of the device. An orientation sensor, such as an accelerometer or a compass is configured to detect an orientation of the device based on the direction of gravity. Additionally, the processor 202 is configured to, with the content of the memory 204, and optionally with other components described herein, to cause the apparatus 200 to determine a time delay associated with times of arrival of the operation inputs at different audio sensors of the device. In particular, the plurality of audio sensors 208 are configured on the device in such a manner that the operation inputs may reach different audio sensors at different time instances, thereby causing a delay in a times of arrival (TOA) of audio signals associated with the operation input. Herein, the time period required by an operation input to reach to an audio sensor is referred to as 'time of arrival', and the difference between the TOA of the audio sensors 208 is referred to as the 'time delay'. In an example embodiment, the determination of the time delay facilitates in determining the direction of the operation input such as the directional audio commands. In an example embodiment, the time delay between the times of arrival of the operation input at different audio sensors can be effectively determined in case respective paths travelled by the operation input from the audio source to the different audio sensors are of significantly different lengths. For example, when the respective paths travelled by the audio signals associated with the operation input from the audio source to arrive at the different audio sensors is greater than a predetermined threshold length, then the time delay between the times of arrival of the operation input from the audio source to different audio sensors may be effectively determined. It will be noted that the plurality of audio sensors 208 may be configured in various directions around the apparatus 200 so that the difference in the times of arrival of the audio signals at these audio sensors/microphones facilitate in detection of the operation input. In an example embodiment, the apparatus 200 includes means such as processing means for determining whether the time delay between TOA of the operation input at the two or more audio sensors of the device corresponds to one direction from among the set of predetermined directions. It will be noted that present examples provided herein for the direction determination are not limiting or excluding alternative solutions for the direction determination, and in various other example embodiments, the direction determination can also be performed by other known techniques. An example of the processing means may include the processor 202, which may be an example of the controller 108. Various example arrangements of the plurality of microphones being configured on the device are illustrated and explained further with reference to FIGS. 3A-3C.

In an example embodiment, the times of arrival can be transformed into the direction of sound source relative to the device. In an example embodiment, the processor 202 is configured to, with the content of the memory 204, and optionally with other components described herein, to cause the apparatus 200 to transform the time delay into the direction associated with the sound source relative to the device. Various example embodiments of transforming the time delay into a unique sound direction for different orientations of the apparatus 200 are explained further with reference to FIGS. 3A-3C.

Figure 3A:
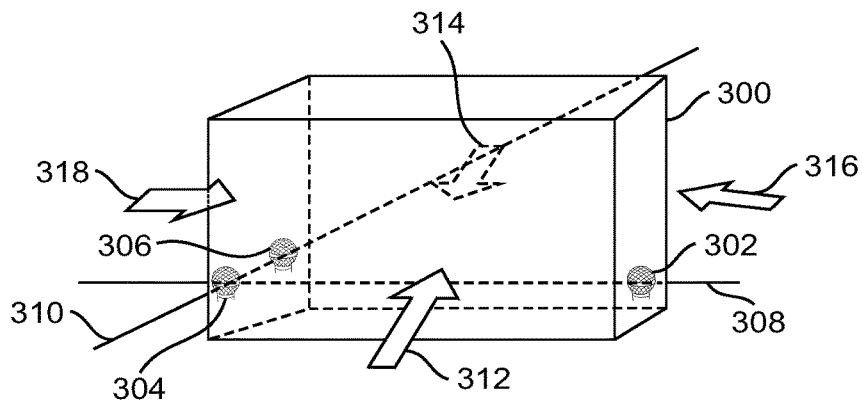
FIGS. 3A-3C illustrates example configurations of a plurality of audio sensors for input detection, in accordance with example embodiments.
Figure 3B:
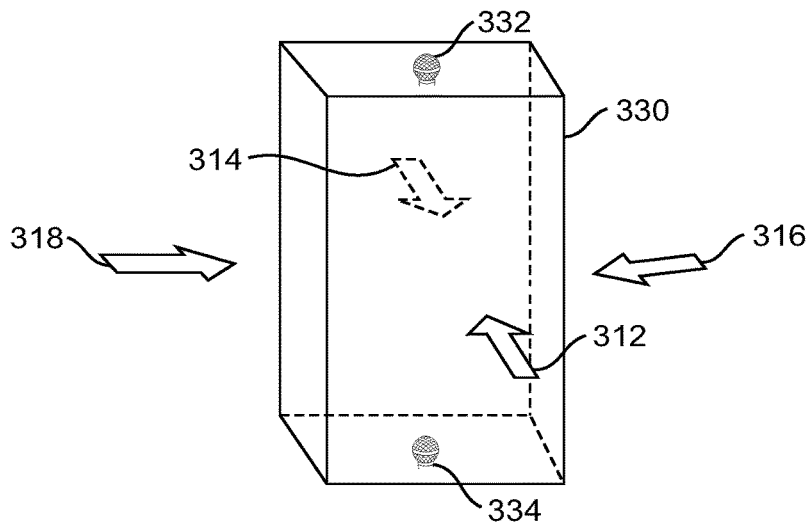
Figure 3C:
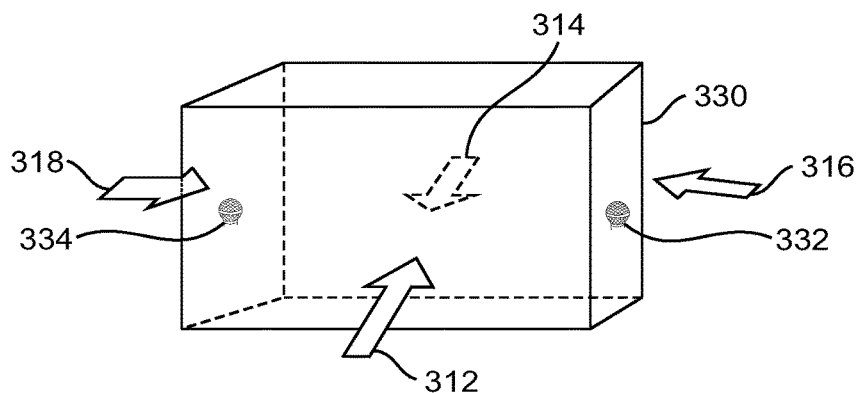

FIGS. 3A-3C illustrates example configurations of a plurality of audio sensors on a device (for example, the device 100) for input detection, in accordance with example embodiments. In an example embodiment, the plurality of audio sensors facilitates in performing the input detection in a first mode of operation of the device by using the plurality of audio sensors. An operation input, for example a sound command and/or a touch command, received at the device can be detected by two or more audio sensors of the device. In an example embodiment, the two or more audio sensors include microphones. In an example embodiment, the two or more microphones detect a direction of an audio source from which the operation input is received. In an example embodiment, for detection of the direction of the audio source, the two or more microphones are configured in positions such that the sound or vibrations from the operation input reaches different microphones at different times, and a time difference between times of arrival of audio signals associated with the operation input at the different microphones facilitates in detection of the direction of the operation input. For example, in case the paths taken by audio/sound signal to travel from the audio source to the two or more microphones' positions are of significantly different lengths, the delay between the times of arrival of the audio signals to the two or more microphones can be large enough for direction detection of the operation input.

As illustrated in FIG. 3A, a plurality of audio sensors, such as microphones 302, 304, 306 are shown to be embodied in a device 300. In an example embodiment, the device 300 is an example of the device 100 (FIG. 1). In an example embodiment, the device 300 embodies an apparatus, for example, the apparatus 200 (FIG. 2). In an example embodiment, the configuration of the plurality of microphones 302, 304, 306 embodied in the device 300 facilitates in determination of the direction of the operation input received at the device 300. The microphones 302, 304, 306 are configured in the device 300 in such a manner that the microphones, such as microphones 302, 304 lie on a horizontal axis/line (such as line 308), and the microphones 304, 306 lie on a horizontal axis/line (such as line 310). In an example embodiment, any two microphones from among the plurality of microphones 302, 304, 306 may be utilized for reliably and unambiguously detecting the direction of the operation input received at the device 300.

In an example embodiment, the device 300 is configured to receive the operation input such as audio/sound signals from a plurality of directions such as from front direction 312, back direction 314, right direction 316, left direction 318, and so on. In an example embodiment, the audio signals coming from left direction 318 or the right direction 316 may reach the microphones 302, 304 at different times, however the audio signals coming from the front direction 312 or the back direction 314 may reach the microphones 304, 306 at nearly the same time. In an example embodiment, due to difference in the times of arrival of the audio signals at the microphones 302, 304, the microphones 302, 304 are able to detect the sound commands coming from the left direction 318 and/or the right direction 316. In an example embodiment, the microphones 302, 304 have a "left-right separation" because the difference in the paths travelled by the sound to reach the microphones 302, 304 is greater than a predetermined threshold distance. In an example embodiment, the microphones 304, 306 do not have a "left-right separation" because the paths/distances travelled by the sound coming from the left 318 or right direction 316 to reach the microphones 304, 306 are same or nearly same. In an example embodiment, the time of arrival of the audio signal coming from the front direction 312 and/or back direction 314 may be different at the microphones 304 and 306, and may therefore facilitate in detecting the direction of the audio signal. In an example embodiment, the microphones 304, 306 are said to have a "front-back separation" because the difference in the paths travelled by the sound to reach the microphones 304, 306 is greater than the predetermined threshold distance. In an example embodiment, the microphones 302, 304 do not have a "front-back separation" because the paths/distances travelled by the sound in the front/back directions to reach the microphones 302, 304 are same or nearly same.

As explained in the foregoing example, the device 300 detects the operation input if the device 300 is in an orientation that is suitable for detection of the operation input. In an example embodiment, the device 300 in one orientation is associated with a plurality of predetermined directions that facilitates in receiving the operation input at the device 300. In an example embodiment, a determination of the orientation of the device 300 is utilized for determining whether the device 300 is in any such orientation that any of the predetermined directions can be detected at the device 300 using the two or more audio sensors/microphones. In an example embodiment, the directional commands being received from one of set of predetermined directions can be identified at the device 300. In an example embodiment, the device 300 can include a memory for storing instructions corresponding to the directional commands, and on detection of the directional command being received at the device 300, the corresponding instructions are executed at the device 300.

In an example embodiment, the device 300 is able to detect the sound command being received from the front direction 312, the back direction 314, the right direction 316, the left direction 318, and thus the directions 312-318 are the predetermined directions. For example, in case the audio signals from the audio source arrives at the microphone 302 before arriving at microphone 304, and the audio signals arrives approximately at the same time at the microphones 304 and 306, then the detected audio command direction is determined to be the right direction 316. In another example, in case the audio signals arrives at the microphone 304 before arriving at the microphone 302, and audio signals arrives approximately at the same time at microphones 304 and 306, then the detected audio command direction is determined to be the left direction 318. In yet another example, in case the audio signals arrives at the microphone 304 before arriving to the microphone 306, and audio signals arrives approximately at the same time at microphones 302 and 304, then the detected audio command direction is determined to be the front direction 312. In still another example, in case the audio signals arrives at the microphone 306 before arriving to the microphone 304, and the audio signals arrives approximately at the same time at the microphones 302 and 304, then the detected audio command direction is determined to be the back direction 314.

In some example scenarios, the device 300 may not be able to reliably detect the direction of the audio input. For example, in case the delay between the times of arrival at the two or more audio sensors does not correspond to a unique direction, the device 300 switches to second mode of operation for detecting operation inputs such as directional input commands. In an example embodiment, in the second mode, the device 300 detects the direction of the audio source by performing an activity detection using various other sensing means such as touch sensors, hover sensors, image sensors, in addition to the audio sensors. For example, it is determined whether the hover sensor has detected a hover activity/motion at the same time when the audio sensors detected the direction of the audio command. Additionally or alternatively, it is determined whether the touch sensor has detected a touch activity at the same time when the audio command is detected by the audio sensor. In an example embodiment, detecting an activity is performed for all the possible directions of the set of predetermined directions. In another example embodiment, detecting for the activity using other sensing means is performed for a subset of the predetermined directions. For example, in FIG. 3A, determining for the activity by using the other sensing means is performed for an "up" direction and a "down" direction only, since the activity in other four directions are detected by the audio sensors alone. In an example embodiment, if an activity is detected in a particular direction by a non-audio sensor at the same time when the audio command is detected by the audio sensor, the direction may be output as the audio command direction. If however, no activity is detected in any of the directions (for example, in any of the subset directions of the set of predetermined directions), then an error message may be displayed at the device 300. In another example embodiment, when no activity is detected in any of the directions, the audio input received at the device 300 may be ignored. In yet another example embodiment, a visual message may be communicated to the user through the UI of the device 300, asking for user's preference and/or options regarding the selection of the mode of operation of the device 300. Various such example user interfaces are discussed further with reference to FIGS. 5A-5C.

The embodiment described with reference to FIG. 3A includes input direction determination by using three audio sensors. In an example embodiment, the input direction determination is performed by using two audio sensors in FIG. 3B. The two audio sensors are embodied in a device such as a device 330. In an example embodiment, the device 330 may be an example of the device 100 (FIG. 1). In an example embodiment, the device 330 may embody the apparatus 200 (FIG. 200) for operating the device 330 in one of the first mode and the second mode. As illustrated in FIG. 3B, the device 330 includes the audio sensors 332, 334. In an example embodiment, the device 330 incorporating two audio sensors 332, 334 can assume a plurality of orientations, for example a portrait orientation and a landscape orientation. An orientation assumed by the device 330 can be utilized to determine whether the device 330 can detect any of the operation inputs such as the directional audio commands being received at the device 330.

In FIG. 3B, the device 330 is shown to assume the portrait orientation, and in FIG. 3C the device 330 is shown to assume the landscape orientation. In the portrait orientation, the audio signals can arrive at the device 330 from any of the left direction 318, the right direction 316, the front direction 312, and the back direction 314. Audio signals from these directions arrives at the same time to both audio sensors 332, 334 and therefore the device 330 is not able to operate in the first mode, in which the device 330 utilizes the two or more audio sensors for detecting the operation inputs such as the directional audio commands Since the device 330 is not able to reliably detect the direction of the operation inputs using the audio sensors, the device 330 selects the second mode for input detection, in which the device 330 detects the operation inputs by utilizing various other sensing means such as touch sensors, hover sensors, image sensors, and the like in addition to the audio sensors.

In the landscape orientation of the device 330 illustrated with reference to FIG. 3C, the device 330 is able to detect the operation inputs when the operation inputs arrive from the left direction 318 or the right direction 316 since the configuration of the audio sensors facilitate in providing a left-right separation' to the audio sensors 332, 334. For example, in case an operation input is received at the audio sensor 332 before being received at the audio sensor 334 and the absolute value of TOA difference (or the time delay) is above a predetermined threshold value, the audio signal can be determined to be received from the "right" direction 316. In an example embodiment, in case an audio signal is received at the audio sensor 334 before being received at the audio sensor 332 and the absolute value of the TOA (or the time delay) is above the predetermined threshold value, the operation inputs associated with the audio signal can be detected to arrive at the device 330 from the "left" direction 318. In an example embodiment, since the audio sensors 332, 334 do not support front-back separation, the device 330 is not able to detect directions of the operation inputs if the audio signals arrive from the front direction 312 or the back direction 314. Since the device 330 is not able to reliably detect the input audio direction using the audio sensors in the first mode, the device 330 selects the second mode, in which the device 330 detects the operation inputs by various other sensing means such as touch sensors, hover sensors, image sensors, in addition to the audio sensors.

FIGS. 4A-4B illustrates example waveforms representative of audio signals being received at two audio sensors of a device, for example, the device 330 (FIG. 3B-3C) in various orientations of the device 330. The waveforms shown in FIGS. 4A-4B are representative of the audio signals in portrait and landscape orientations, respectively of the device 330. In particular, FIG. 4A represents the signals 412, 414 being received at the audio sensors 334, 332 (FIG. 3B) respectively, and FIG. 4B represents the signals 422, 424 being received by the audio sensors 334, 332 (FIG. 3C), respectively. Herein, the waveforms are representative of the audio signals being recorded at the microphones 332, 334 of the device 330 in response to an audio input received from an audio source located towards a right side of the device 330. For example, the audio input may be generated by a finger snap towards a right side of the device 330.

Referring to FIG. 4A, the waveforms 412, 414 illustrates signals being received at the audio sensors 334, 332 (FIG. 3B) respectively, when the direction of the audio source is towards the right side (for example, the right direction 316, FIG. 3B) of the device 330. In an example embodiment, the audio sensors 334, 332 are capable of detecting audio signals that are travelling along an (imaginary) axis passing through them, in a top-down direction. However, the sensors 334, 332 do not have a right-left separation, and accordingly the TOA of the audio signals at the sensors 334, 332 being received from the audio source situated to the right side of the device 330 may be same or nearly same. As illustrated in FIG. 4A, the time delay between the audio signals being received at the audio sensors 334, 332 is insignificant, and accordingly the audio sensors 334, 332 cannot be utilized for detecting the audio signals coming from the right direction or the left direction. In other words, the device 330 is not able to detect the audio signal coming from the right direction or the left direction while operating in the first mode. In this example embodiment, the device 330 selects/switches to the second mode (explained with reference to FIG. 3B) for detection of the audio signals being received from the right direction or the left direction of the device 330. In an example embodiment, in case the device is currently operating in the first mode, then on assuming the portrait orientation, the device switches from the first mode to the second mode of operation.

FIG. 4B refers to the scenario when the device 330 is in the landscape orientation, as described with reference to FIG. 3C. Referring now to FIG. 4B, the waveforms 422, 424 illustrates signals being received at the audio sensors 334, 332 (FIG. 3C), when the direction of the audio source is towards the right side (for example, the right direction 316, FIG. 3C) of the device. In an example embodiment, the sensors 334, 332 have "left-right" separation, meaning thereby that the sensors are capable of detecting audio signals that are travelling along an (imaginary) axis passing through them, in a left-right direction, and accordingly the times of arrival of the signals received at the audio sensors 334, 332 of the signal from the audio source situated to the right side of the device 330 may be different. As illustrated in FIG. 4B, the time delay/difference between the audio signals 422, 424 associated with the audio sensors 334, 332, respectively is significant enough, and accordingly the sensors 334, 332 are utilized for detecting the audio signal coming from the right direction or the left direction towards the device. In this example embodiment, the device 330 selects the first mode for detection of the audio signal received from the right direction or the left direction of the device 330.

FIGS. 5A-5C illustrates operations at an example user interface 500 associated with a device, for example, the device 100/300/330 (FIGS. 1/3A-3C) for detecting input at the device, in accordance with example embodiments. The user interface 500 is configured to facilitate a user to control at least one function of the device through the use of a display. For example, the user interface is configured to facilitate control of a media player application through the use of the display. As illustrated in FIG. 5A, the UI 500 includes a plurality of windows for example, windows 502, 504, and 506 associated with the media player application. As shown, the window 502 displays the plurality of audio content, for example, audio content files ABCD, EFGH, IJKL, MNOP, QRST, and so on. The window 504 displays the current audio content being played, and the window 506 displays various media control options such as play, pause, next media, previous media, and so on. It will be noted that herein the user interface 500 is shown to facilitate control of various functions of the media player application, for illustrative purposes only. The user interface 500 facilitates user input for controlling functions of a variety of applications without limiting the scope of various embodiments described herein.

In an example embodiment, the user interface 500 is configured to receive an operation input that may command execution of various functions at the device. In an example embodiment, the operation input received at the device is an audio input. In an example embodiment, the audio input is an audio command. In an example embodiment, the audio input is a sound uttered by a user. For example, as illustrated in FIG. 5A, an audio input is received from a user, where the user 520 utters a word, such as 'Next', for commanding that a song next to the currently selected song be played at the device. It will be noted that in various other embodiments, the audio input includes various other sounds and/or acoustic signals that are received from a multitude of sound sources. For example, the acoustic signals produced by activities such as clicking fingers in proximity to the device, tapping on a surface close to the device, tapping the device, sound of keys being shuffled near the device, so on and so forth, may also be provided as audio input to the device.

In an example embodiment, the audio command can be executed at the device, when the direction of the audio command is reliably detected at the device, as explained with reference to FIG. 2. In an example embodiment, on non-detection of the directional audio input at the device, the UI 500 notifies the user that the device is unable to detect directional audio inputs. In an example embodiment, when the audio command is not detected at the device by two or more audio sensors such as audio sensors 302, 304, 306 (FIG. 3A) embodied in the device, the device selects a second mode of operation for detecting inputs at the device. In the second mode, the device utilizes one or more non-audio sensors such as hover sensor, an image sensor, a touch sensor along with at least one audio sensor for detecting the input at the device. For example, the touch sensor detects a touch at the device at the same time when the audio sensor detects an audio input at the device. In another example scenario, the hover sensor detects a hovering motion over the device, and at the same time the image sensor captures an image of a user's hand used for hovering over the device.

As illustrated in FIG. 5B, in the second mode, a hover motion is being performed by a user (depicted as being performed by a user hand 532), for providing the input to the device. When the user performs a hover motion over the device, the non-audio sensors such as the hover sensors detects the hover motion. Additionally or alternatively, the audio sensors detects audio signal being produced at the time of hover motion. In an example embodiment, on detection of the audio signal (by the audio sensors) and the hover motion (by the hover sensors), the device facilitates in execution of operation inputs being input to the device. In another example embodiment, the hover sensor can detect the hover motion performed by the user, and based on the detection of hover motion only, the device facilitates in execution of the operation inputs input to the device in the second mode. For example, as illustrated in FIG. 5C, due to the selection of the second mode and the hover action being performed by the user, the operation inputs, for example, the command input given by the hover motion over the next song (EFGH) by the user is executed, and the next song which is EFGH song is played at the device.

Figure 6A:
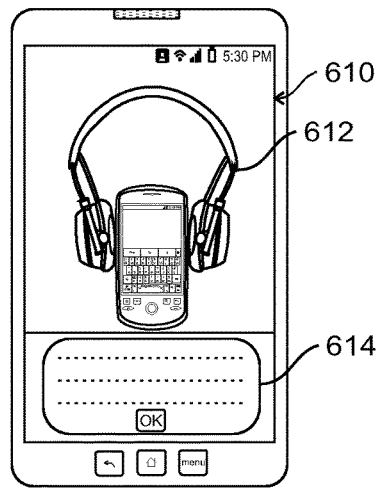
FIGS. 6A-6C illustrates examples of display at a user interface of a device for detecting input at the device, in accordance with various example embodiments.
Figure 6B:
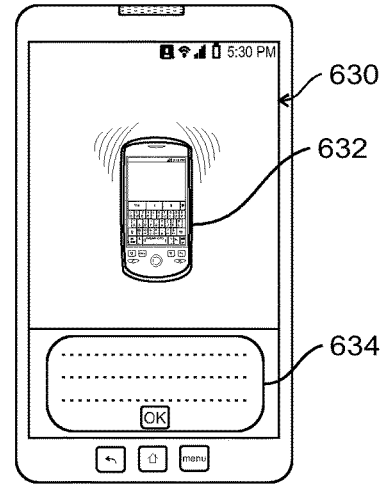
Figure 6C:
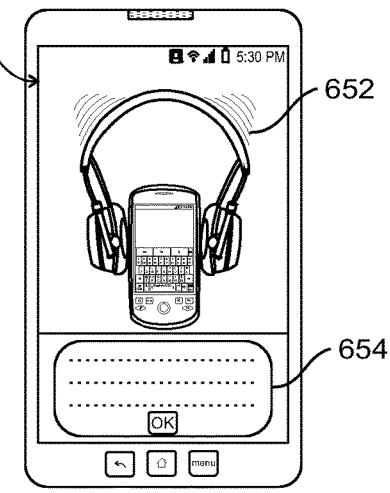

FIGS. 6A-6C illustrates examples of display 610, 630, 650 at a user interface of a device in a second mode of operation of the device, for example the device 100 (FIG. 1), for detecting input at the device, in accordance with various example embodiments.

In an example embodiment, the device is operating in a first mode, where the device utilizes two or more audio sensors for detecting operation inputs such as directional audio commands received at the device. In an example embodiment, the audio sensors also monitor an ambient noise level associated with the device. In an example scenario, the ambient noise level at the device is detected to be more than a predetermined threshold level of noise. On detecting the ambient noise level to be more than the predetermined threshold level of noise, a notification is presented to the user of the device. An example notification being presented on the device is illustrated in FIG. 6A. As illustrated in FIG. 6A, the display 610 shows an image 612 of a mobile device along with a hearing protector indicating that the ambient noise level is too high to reliably detect a directional audio command received at the device. Additionally or alternatively, the display 610 facilitates displaying an indication in a window 614 that "The directional audio command (being generated by tapping a nearby surface or clicking fingers in proximity to the device) cannot be detected at the device". In an example scenario, the window 614 additionally displays a message prompting the user to switch to the second mode for detection of operation input at the device. In some examples, the display indicates to the user to use non-audio operation input by playing audio messages on the device. An example flowchart illustrating a method for input detection on determining the ambient noise level to be greater than the predetermined threshold noise level is explained further with reference to FIG. 9.

In another example embodiment, it is to be detected at the device, by an accelerometer, that a motion level of the device is greater than or equal to a predetermined threshold level of motion. For example, the device can be fixed on a dashboard of a vehicle which can be passing through a rough terrain, thereby experiencing high level of motion. On detecting high motion level of the device, the device terminates an operation thereof in the first mode, meaning thereby that the device may not utilize two or more audio sensors for detecting the operation inputs being input to the device. In an example embodiment, the device can then select the second mode of operation, wherein the device utilizes at least one of the two or more audio sensors and at least one non-audio sensor for input detection at the device. In an example embodiment, a notification is presented on a display of the device indicating non-operability of the device in the first mode and switching of the device to the second mode. An example notification being presented on the device is illustrated in FIG. 6B.

As illustrated in FIG. 6B, the display 630 shows an image indicating that the motion level of the device is greater than the predetermined threshold level of motion. For example as shown in FIG. 6B, the display 630 shows an image 632 of a shaking mobile device, thereby indicating that the motion level of the device is too high to reliably detect an operation input. Additionally or alternatively, the display 630 facilitates displaying an indication that "The directional audio commands cannot be detected at the device", in a window 634. In an example scenario, the window 634 additionally displays a message prompting the user to select the second mode of operation for input detection at the device. In some examples, the display 630 indicates to the user to use non-audio input commands by playing audio message on the device. An example flowchart illustrating a method for input detection on the determination of the motion level of the device to be greater than the predetermined threshold level of motion, is explained further with reference to FIG. 10.

In yet another example embodiment, it is detected at the device that the motion level of the device is greater than or equal to the predetermined threshold level of motion, and the ambient noise level is greater than or equal to the predetermined threshold level of noise. In an example embodiment, the motion level of the device is monitored by at least one motion sensor embodied in the device, and the noise level is monitored by at least one audio sensor embodied in the device. In an example embodiment, the device then selects the second mode of operation, where the device utilizes at least one of the two or more audio sensors and at least one non-audio sensor for input detection at the device. For example, the device can utilize an audio sensor along with a non-audio sensor for input detection at the device. Alternatively, the device can facilitate the input detection by using a non-audio sensor only, such as a hover sensor.

In an example embodiment, a notification is presented to a user of the device indicating non-operability of the device in the first mode and switching of the device to the second mode. An example notification being presented on the device is illustrated in FIG. 6C. As illustrated in FIG. 6C, the display 650 illustrates an image 652 being presented on the display, where the image 652 is indicative of high motion and noise levels associated with the device. For example, as shown in FIG. 6C, the display 650 shows an image 652 of a mobile device along with a hearing protection indicating that the ambient noise level is too high to reliably detect an audio input associated with an operation input. Moreover, the image may be shown as shaking on the display to indicate that the motion level of the device is too high to reliably detect the operation input by actions such as tapping, clipping, touching, hovering, and the like. Additionally or alternatively, the display 650 may facilitate displaying an indication that "The directional audio command (being generated by tapping a nearby surface or clicking fingers in proximity to the device) cannot be detected at the device", in a window 654. In an example scenario, the window 654 may additionally display a message prompting the user to switch to the second mode of operation for input detection. An example flowchart illustrating a method for input detection on determination of one or more operating conditions such as high ambient noise level and high motion level of the device, is explained further with reference to FIG. 11.

It will be noted that FIGS. 3A to 6C are provided for the representation of examples only, and should not be considered limiting to the scope of the various example embodiments. Various example embodiments for input detection are described further with reference to FIGS. 7-11.

Figure 7:
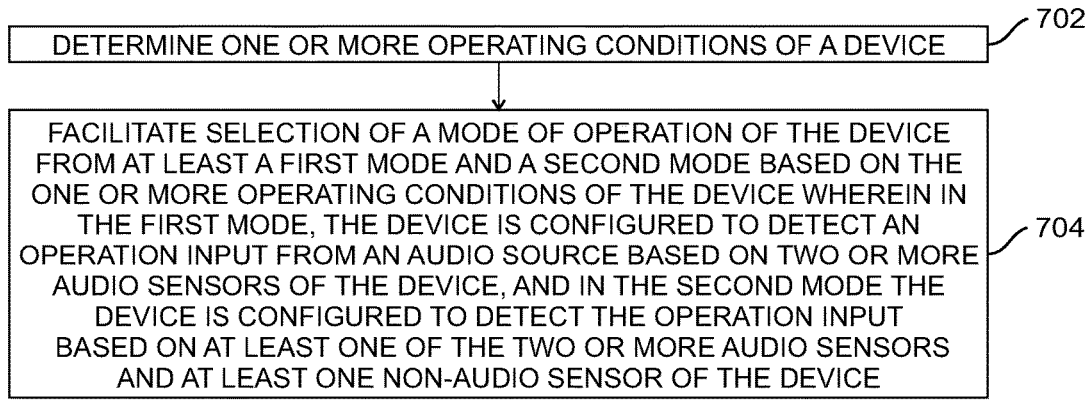
FIG. 7 is a flowchart depicting an example method for input detection at a device, in accordance with an example embodiment.

FIG. 7 is a flowchart depicting an example method 700 for input detection at a device, in accordance with an example embodiment. Example references are made to FIGS. 2 to 6C for the description of the method 700. The method 700 depicted in the flowchart may be executed by, for example, the apparatus 200 of FIG. 2. In an example embodiment, the apparatus 200 may be embodied in the device for facilitating input detection at the device.

In an example embodiment, the device is configured to receive operation inputs, being generated by an audio source, as input. In an example embodiment, the device is configured to perform input detection for detecting the operation inputs. In an example embodiment, the device is configured to operate in a first mode for detecting the directional audio input, where the device detects the operation inputs such as directional audio command using two or more audio sensors. An example of detection of the directional audio input is explained in detail with reference to FIGS. 3A-3C. In some example scenarios, due to one or more operating conditions of the device, the device is not able to detect the directional audio command by utilizing the two or more audio sensors.

At 702, the method 700 includes determining the one or more operating conditions of a device. In an example embodiment, determining the one or more operating conditions may include (1) determining environmental conditions such as ambient noise level and motion level of the device, and/or (2) determining orientation or position of the device relative to the audio source. In an example embodiment, the ambient noise level of the device is determined by at least one audio sensor embodied in the device. In an example embodiment, the at least one audio sensor may be embodied on the device, as discussed with reference to FIGS. 3A-3C. In an example embodiment, the at least one audio sensor monitors the noise level associated with the device. In an example embodiment, the motion level of the device may be monitored by an accelerometer embodied in the device. In an example embodiment, the orientation or position of the device relative to the audio source may be determined based on an orientation sensor such as an accelerometer embodied in the device.

At 704, selection of a mode of operation of the device from at least a first mode and a second mode is facilitated based on the one or more operating conditions of the device. In an example embodiment, in the first mode of operation, the device is configured to detect an operation input from the audio source based on utilizing two or more audio sensors embodied in the device. If however, due to the one or more operating conditions the device is not able to detect the operation input, the device selects the second mode of operation. In the second mode of operation, the device detects the operation input received at the device by utilizing at least one of the two or more audio sensors and at least one non-audio sensor. Various embodiments describing the selection of the second mode of operation for input detection based on the one or more operating conditions of the device are described further with reference to FIGS. 8 to 11.

Figure 8:
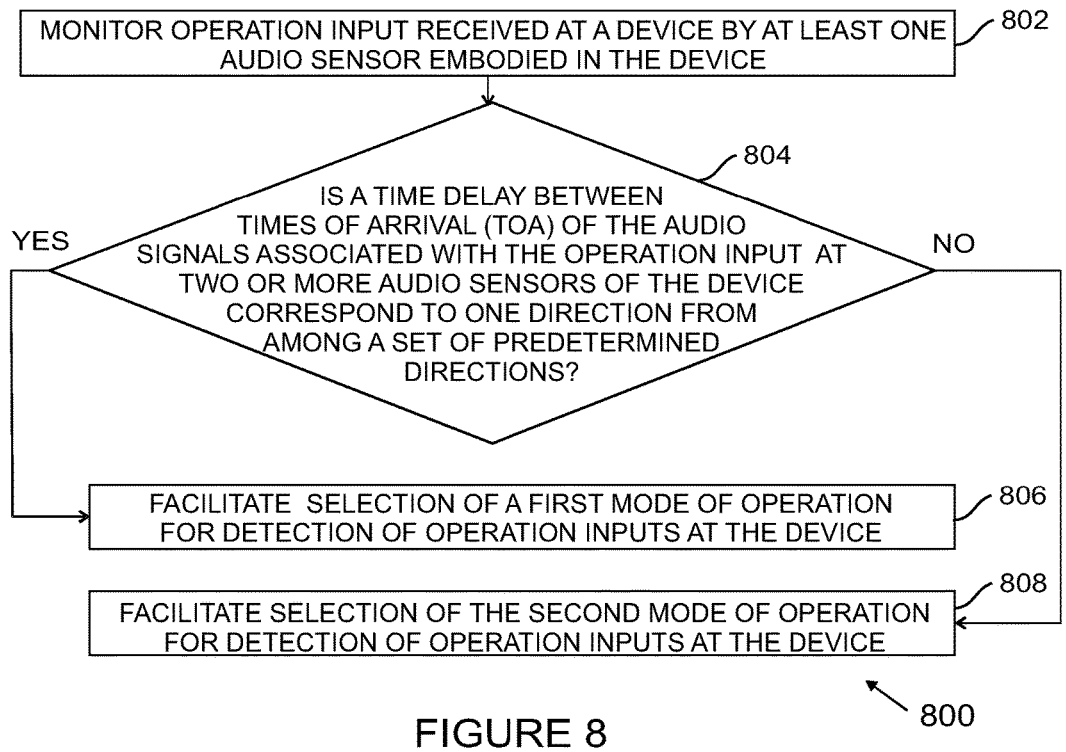
FIG. 8 is another flowchart depicting an example method for input detection at a device, in accordance with an example embodiment.

FIG. 8 is a flowchart depicting an example method 800 for input detection at a device, in accordance with another example embodiment. Example references are made to FIGS. 2 to 6C for the description of the method 800. The method 800 depicted in the flowchart may be executed by, for example, the apparatus 200 of FIG. 2. In an example embodiment, the apparatus 200 may be embodied in the device for facilitating input detection at the device.

At 802, the method 800 includes monitoring an operation input received at the device by at least one audio sensor embodied in the device. In an example embodiment, the operation input includes an audio command. Various audio object recognition methods can be used for detecting the audio command. In an example embodiment, the audio command is generated by an audio source located in a close proximity to the device. For example, the audio command is a spoken command being uttered by a user. In another example embodiment, the audio command is issued by tapping a finger on a surface in proximity to the device. In yet another example embodiment, the audio command is generated by a device or object, for example a set of keys in proximity to the device. It will be noted that the audio command is provided by any object, without limiting the scope of various embodiments.

In an example embodiment, the audio command is received/detected by two or more audio sensors associated with the device. Example of the audio sensors includes microphones. In an example embodiment, at least one audio sensor from among the two or more audio sensors constantly monitors receipt of any audio input at the device. Additionally, a processor (for example, the processor 204) embodied in the device compares portions of the received audio input with a set of pre-stored audio commands at the device. When a correlation between the portion of the received audio input and a pre-stored audio command is greater than or equal to a predetermined threshold, the audio input is determined to be an audio command. In an example embodiment, the correlation between the audio signal received at a microphone (1) and stored audio commands is given by the following expression:

$$\frac{\sum_{i=I_1}^{I_2} m_1(i)d(i)}{\left|\sum_{i=I_1}^{I_2} m_1(i)\right|\left|\sum_{i=I_1}^{I_2} d(i)\right|}$$

where, $m(I_1 \ldots I_2)$ is a portion of an audio signal received at the audio sensor, and $d(I_1 \ldots I_2)$ is a stored command in a database.

On detecting that the audio signal received at the audio sensor (or microphone) corresponds to the audio command, a time delay between times of arrival (TOA) of the audio signals associated with the operation input at two or more audio sensors of the device is determined. In an example embodiment, said time delay can be determined based on the correlation. In an example embodiment, the time delay between the audio command reaching (in samples with the used sampling frequency) at two microphones such as microphone (1) and microphone (2) may be determined based on the following expression:

$$\tau_{1,2} = \text{argmax}_{\tau} \frac{\sum_{i=I_1}^{I_2} m_1(i)m_2(i-\tau)}{\left|\sum_{i=I_1}^{I_2} m_1(i)\right|\left|\sum_{i=I_1}^{I_2} m_2(i-\tau)\right|}$$

Based on the determination of the time delay, it is determined at 804 whether the time delay corresponds to one direction from among a set of predetermined directions. In an example embodiment, the determination of whether the time delay corresponds to one direction from among the set of predetermined directions, may be dependent on the orientation of the device and/or positions or locations of the two or more audio sensors on the device relative to the audio source, as illustrated and explained with reference to various example embodiments described in FIGS. 3A-3C.

If it is determined at 804 that the time delay corresponds to one direction from among a set of predetermined directions, selection of the first mode of operation for detection of operation inputs (for example, directional audio commands) at the device is facilitated, at 806. In the first mode, the two or more audio sensors facilitates in detection of the operation inputs at the device. If however, the time delay does not correspond to one direction from among the set of predetermined directions, the second mode of operation is selected for detection of the operation inputs at the device, at 808. In the second mode of operation, the at least one audio sensor and at least one non-audio sensor is utilized for detection of operation inputs at the device.

In an example scenario, it is determined that the operation input direction is not detected. In such a scenario, a termination of the detection of the operation input direction is facilitated. For example, the device may ignore the audio input received at the device. In another example embodiment, an error message may be displayed to the user indicating that the audio input does not correspond to a valid input. In still another example embodiment, receipt of a user input for detection of the input direction may be facilitated. For example, in case the input is provided by means of a user clicking fingers over a top edge of the device, the UI of the device may facilitate in providing a message/question to the user for clarifying whether the user's intent is an "up" option or a "down" option. The message may be prompted in a number of ways. For example, in the message the "up" option may be shown towards a right side of the display screen while the "down" may be shown towards a left side of the display screen of the device. In an example embodiment, the user may select one of the options provided on the display screen to select one of the input directions. On selection of the input direction, the operation input direction may be provided as the output. Herein, 'providing the input direction as the output' may refer to executing a command associated with the input direction. For example, in case the device playing a playlist of songs may receive an audio command, and based on the input command the input direction is detected as the "up" direction, then the command associated with the "up" direction may be executed, and a previous (to the current song) song may be played in the device. Various other example embodiments for input detection are described further with reference to FIGS. 9-11.

Figure 9:
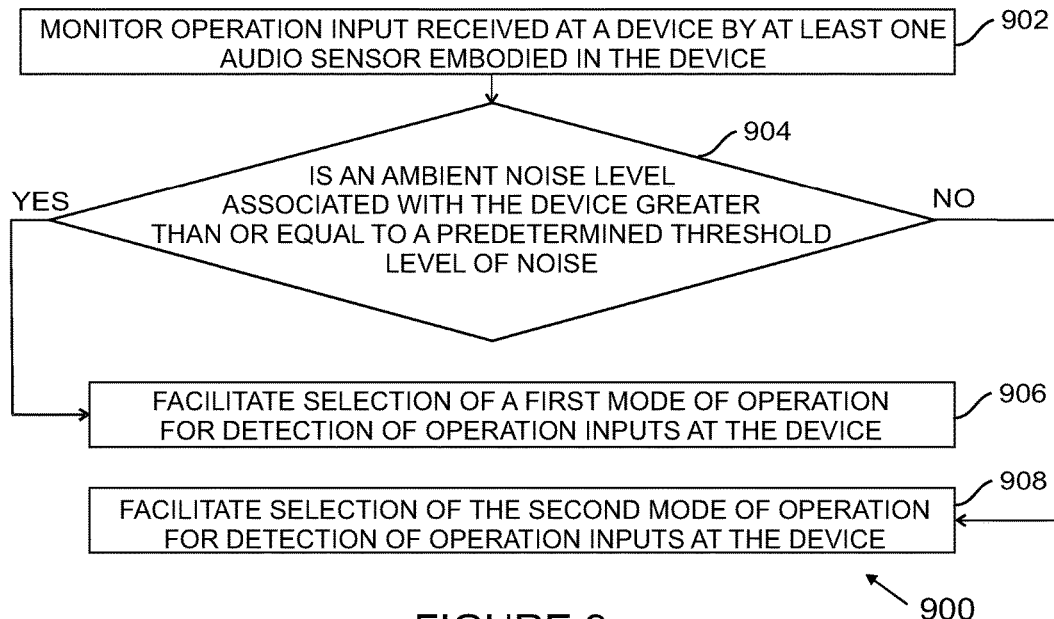
FIG. 9 is yet another flowchart depicting an example method for input detection at a device, in accordance with an example embodiment.

FIG. 9 is a flowchart depicting an example method 900 for input detection at a device, in accordance with another example embodiment. Example references are made to FIGS. 2 to 6C for the description of the method 900. The method 900 depicted in the flowchart may be executed by, for example, the apparatus 200 of FIG. 2. In an example embodiment, the apparatus 200 may be embodied in the device for facilitating input detection at the device.

In an example embodiment the detection of an operation input, for example, directional audio commands at the device may be hampered in case of noisy surroundings. In case, the ambient noise levels are too high, the directional audio signals/commands are not detected reliably by a device, for example, the device (explained with reference to FIGS. 1 to 6C) since the noise may mask the audio commands directed towards the device. In an example embodiment, the device may include audio sensors, such that at least one audio sensor embodied in the device monitors the audio input received at the device, at 902. The noise level associated with the audio input may be compared with a predetermined threshold level of noise to determine whether the audio input at the device is an audio command or a noise signal.

At 904, it is determined whether the ambient noise level associated with the device is greater than or equal to the predetermined threshold level of noise. If it is determined at 904 that the ambient noise level associated with the device is determined to be less than the predetermined threshold level of noise, the selection of the first mode of operation of the device is facilitated for detection of operation inputs, at 906. In the first mode, the two or more audio sensors facilitates in detection of the operation inputs at the device. If however, the ambient noise level associated with the device is determined to be greater than or equal to the predetermined threshold level of noise, the second mode is selected for detection of the operation inputs at the device, at 908. In the second mode of operation, the at least one audio sensor and at least one non-audio sensor is utilized for detection of input commands at the device. In an example embodiment, the device may facilitate in provisioning of information regarding the selection of the second mode at the device. For example, a user interface of the device may facilitate displaying an indication that "The directional audio command (being generated by tapping a nearby surface or clicking fingers in proximity to the device) cannot be detected at the device". In an example scenario, the device may display an image indicating that the operation inputs may not be reliably detected. An example of user interface indicating the operation inputs not being detected at the device is explained in detail with reference to FIG. 6A.

Additionally or alternatively, the user interface may display a message prompting the user to manually switch from the first mode to the second mode for input detection. Based on the user input, the second mode can be selected for the input detection at the device. For example, on displaying the message prompting the user to switch to the second mode, the user may perform a tapping action on the device to determine whether in the second mode (i.e. tapping action mode) the device can reliably detect the input. On determining that in the second mode, the device can reliably the input, the user can manually switch the device from the first mode to the second mode. In the second mode, at least one non-audio sensor for example, touch sensors, hover sensors, and image sensors, along with the audio sensors are utilized for detecting the input to the device. In an example embodiment, the audio sensors such as microphones embodied in the device may be able to detect vibrations caused due to tapping at the device, thereby facilitating in detecting the vibrations caused due to non-audio inputs such as tapping.

In an alternate embodiment, the at least one non-audio sensor facilitates in input detection at the device. For example, in the second mode a hover sensor can be activated for detecting the operation input produced by the hover motion performed by the user. Various other example embodiments for input detection are described further with reference to FIGS. 10-11.

Figure 10:
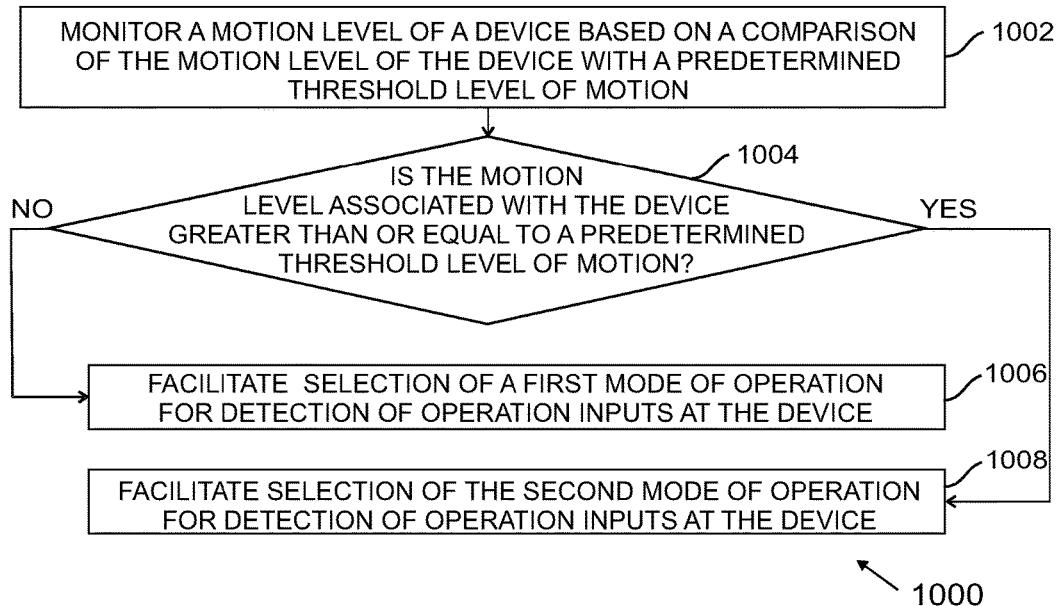
FIG. 10 is still another flowchart depicting an example method for input detection, in accordance with an example embodiment.

FIG. 10 is a flowchart depicting an example method 1000 for input detection at a device, in accordance with another example embodiment. Example references are made to FIGS. 2 to 6C for the description of the method 1000. The method 1000 depicted in the flowchart may be executed by, for example, the apparatus 200 of FIG. 2. In an example embodiment, the apparatus 200 may be embodied in the device for facilitating input detection at the device.

In an example embodiment the detection of operation inputs, for example, directional audio commands at the device may not be possible in case the device is associated with a very high motion level. For instance, when the device is held by a user who is indulged in an activity such as dancing, the motion level of the device may be too high to reliably determine directional audio commands at the device. At 1002, the motion level associated with the device is monitored. In an example embodiment, the device may include an accelerometer for monitoring the motion level of the device. The motion level at the device is monitored based on a comparison with a predetermined threshold level of motion to determine one or more operating conditions of the device.

At 1004, it is determined whether the motion level of the device is greater than or equal to the predetermined threshold level of motion. On detecting that the motion level of the device is less than the predetermined threshold level of motion, a first mode of operation of the device is selected at 1006, where the device is able to detect the directional audio command by means of two or more audio sensors. However, on detecting the motion level of the device to be greater than or equal to the predetermined threshold level of the motion, a second mode of operation is selected at 1008. In the second mode of operation, at least one of the two or more audio sensors and at least one non-audio sensor is utilized for detection of operation inputs at the device. In an alternate embodiment, the at least one non-audio sensor facilitates in input detection at the device. For example, in the second mode a touch sensor can be activated for detecting the operation input produced by a touch action performed by the user on the device.

In an example embodiment, on detection of the motion level of the device to be greater than or equal to the predetermined threshold level of motion, information regarding the detection may be provisioned at the device. For example, the UI may facilitate display of a message on the display screen indicating that the motion level/shaking in the device is too high to reliably detect directional operation inputs. In alternate embodiments, the UI may provide audio and/or video messages for indicating that the motion level/shaking in the device is high. An example display of the device indicating a high motion level of the device is illustrated and explained with reference to FIG. 6B. Additionally or alternatively, the UI of the device may facilitate playing of an audio message informing the user to switch to the second mode for operating the device. Another example embodiment for input detection is described further with reference to FIG. 11.

Figure 11:
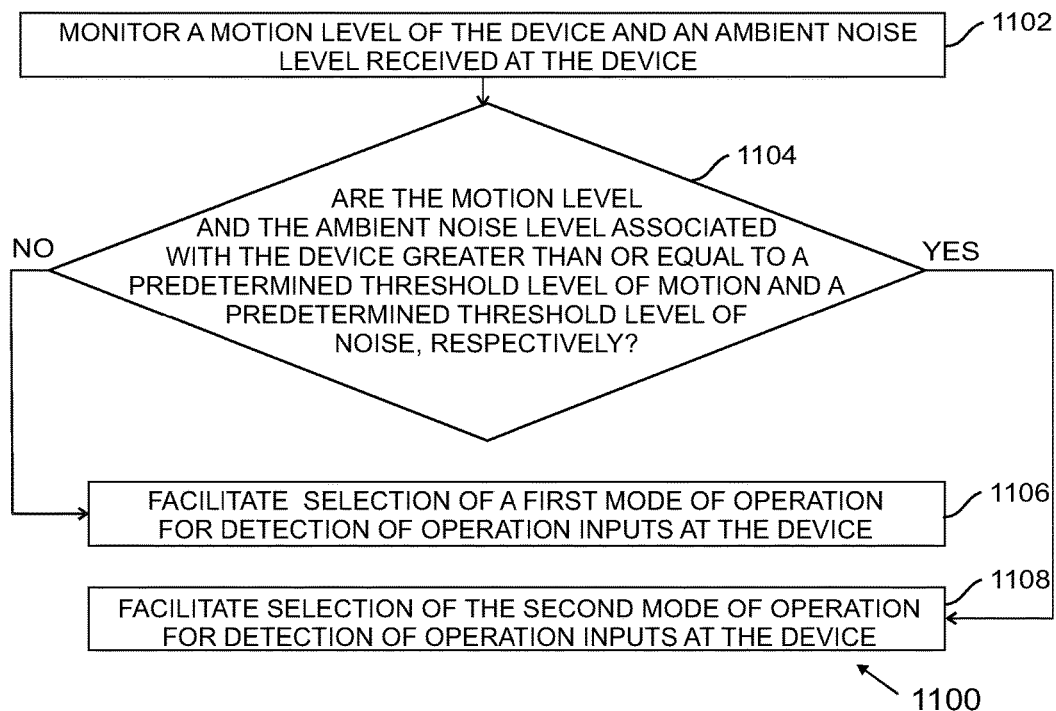
FIG. 11 is still another flowchart depicting an example method for input detection at a device, in accordance with an example embodiment.

FIG. 11 is a flowchart depicting an example method 1100 for input detection at a device, in accordance with another example embodiment. Example references are made to FIGS. 2 to 6C for the description of the method 1100. The method 1100 depicted in the flowchart may be executed by, for example, the apparatus 200 of FIG. 2. In an example embodiment, the apparatus 200 may be embodied in the device for facilitating input detection at the device.

In an example embodiment, a motion level as well as an ambient noise level associated with the device may be monitored, at 1102. In an example embodiment, the device may include accelerometer for monitoring the motion level of the device. Additionally, the device may include audio sensors for monitoring the ambient noise level associated with the device. The motion level and the noise level at the device are then compared with a predetermined threshold level of motion and a predetermined threshold level of ambient noise, to determine one or more operating conditions of the device. At 1004, it is determined whether the motion level and the ambient noise level of the device are greater than or equal to a predetermined threshold level of motion and a predetermined threshold level of ambient noise, respectively. On detecting the motion level and the ambient noise level of the device to be less than the predetermined threshold level of motion and the predetermined threshold level of noise, respectively, at 1104, a first mode of operation of the device is selected at 1006. In the first mode, the device is configured to detect the operation inputs such as directional audio commands by means of the at least one non-audio sensor and at least one audio sensor. If however, the motion level and the noise level of the device are determined to be greater than or equal to the predetermined threshold level of motion and the predetermined threshold level of ambient noise, respectively, the second mode of operation of the device is selected at 1008. In the second mode of operation, at least one of the two or more audio sensors and at least one non-audio sensor is utilized for detection of input commands at the device. In an alternate embodiment, the at least one non-audio sensor facilitates in input detection at the device. For example, in the second mode a touch sensor can be activated for detecting the operation input produced by a touch action performed by the user on the device.

In an example embodiment, on determination of the high motion level and the ambient noise level, information regarding the same may be provisioned at 1104. For example, a user interface of the device may facilitate in displaying an indication that "the directional audio command (being generated by tapping a nearby surface or clicking fingers in proximity to the device) cannot be detected at the device". Additionally or alternatively, an image may be displayed on the display of the UI. For example, the UI may display a shaking image on the display screen indicating that the motion level/shaking in the device is too high to reliably detect directional commands. In alternate embodiments, the UI may provide audio and/or video messages for indicating that the motion level/shaking in the device is high. An example UI indicating high levels of motion and noise levels associated with the device is illustrated and explained with reference to FIG. 6C.

In an example embodiment, the device may automatically select the second mode as the input detection mode. In an alternate embodiment, the user interface of the device may facilitate in displaying a message prompting the user to switch the device to the second mode. Based on the user input, the second mode is selected as the input detection mode at the device. For instance, on displaying the message prompting the user to switch to the second mode, the user may perform a hover motion/action on the device. In an example embodiment, when the hover action is performed in such a manner that it is detected by at least one hover sensor at the device, then the device indicates that the hover action is detected at the device, and the hovering action can be utilized for detecting operation inputs at the device. In an example scenario, the shaking image being displayed at the display of the device may stop shaking when the hover action is detected at the device, thereby informing the user that the hover action can be selected as appropriate input detection mode. In an embodiment, the display may again show a shaking image in case the hovering action is performed in very close proximity of the device. In an example embodiment, in the input detection mode pertaining to the hovering action, the options being displayed on the display screen may be selected by performing a hovering action above those options being displayed at the display of the device.

It should be noted that to facilitate discussions of the flowcharts of FIGS. 7 to 11 certain operations are described herein as constituting distinct steps performed in a certain order. Such implementations are examples only and non-limiting in scope. Certain operations may be grouped together and performed in a single operation, and certain operations may be performed in an order that differs from the order employed in the examples set forth herein. Moreover, certain operations of the methods 700, 800, 900, 1000, and 1100 are performed in an automated fashion. These operations involve substantially no interaction with the user. Other operations of the methods 700, 800, 900, 1000, and 1100 may be performed by in a manual fashion or semi-automatic fashion. These operations involve interaction with the user via one or more user interface presentations.

The methods depicted in these flowcharts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a non-transitory computer-implemented process such that the instructions, which execute on the computer or other programmable apparatus, provide operations for implementing the operations in the flowchart. The operations of the methods are described with help of apparatus 200. However, the operations of the methods can be described and/or practiced by using any other apparatus.

Without in any way limiting the scope, interpretation, or application of the claims appearing below, a technical effect of one or more of the example embodiments disclosed herein is to detect input at a device. In example embodiments, the input may be an audio input or a non-audio input. In various example embodiments, the device may include a plurality of audio sensors and at least one non-audio sensor that can be controlled to reliably detect the input under different operating conditions of the device. The device can switch from a first mode to a second mode and vice-versa based on the one or more operating conditions of the device. In the first mode, the device detects operation inputs such as directional audio commands directed at the device by using two or more audio sensors. In certain scenarios when the device is not able to detect the operation inputs using the two or more audio sensors, the device may switch from the first mode to the second mode, in which the device detects the operation inputs by using at least one non-audio sensor and at least one audio sensor. For example, when an ambient noise level of the device is too high to reliably detect the input using audio sensors, the device may switch a detection mode thereof from the first mode to the second mode. In another example scenario, when a motion level (or shakiness) of the device is too high to reliably detect the input using non-audio sensors, then the device switches the detection mode thereof from the first mode to the second mode. The use of the device in switchable modes such as the first mode and the second mode facilitates in providing an uninterrupted user experience irrespective of changing device orientations, noisy surroundings and shaky environments of the device.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

We claim:

1. A method comprising:
   determining one or more operating conditions of a device by comparing an ambient noise level detected by at least one audio sensor of the device with a predetermined threshold level of noise; and
   facilitating selection of a mode of operation of the device from at least a first mode and a second mode based on the one or more operating conditions of the device,
      wherein in the first mode, the device is configured to detect an operation input from an audio source based on two or more audio sensors of the device, and
      wherein in the second mode, the device is configured to detect the operation input based on at least one of the two or more audio sensors and at least one non-audio sensor of the device.

2. The method as claimed in claim 1, wherein the one or more operating conditions are determined based on an orientation of the device relative to the audio source, the audio source being pre-registered with the device.

3. The method as claimed in claim 1, wherein the one or more operating conditions are determined based on environmental conditions associated with the device.

4. The method as claimed in claim 3, wherein determining the one or more operating conditions based on the environmental conditions comprises comparing a motion level associated with the device with a predetermined threshold level of motion.

5. The method as claimed in claim 1, wherein facilitating the selection of the mode of operation comprises performing one of:
   facilitating selection of the first mode on determining the ambient noise level associated with the device being less than the predetermined threshold level of noise, and
   facilitating selection of the second mode on determining the ambient noise level associated with the device being greater than or equal to the predetermined threshold level of noise.

6. The method as claimed in claim 1, wherein the at least one non-audio sensor comprises one or more of a hover sensor, an image sensor, and a touch sensor.

7. A method comprising:
   determining one or more operating conditions of a device; and
   facilitating selection of a mode of operation of the device from at least a first mode and a second mode based on the one or more operating conditions of the device,
      wherein in the first mode, the device is configured to detect an operation input from an audio source based on two or more audio sensors of the device, and
      wherein in the second mode, the device is configured to detect the operation input based on at least one of the two or more audio sensors and at least one non-audio sensor of the device,
      wherein the one or more operating conditions are determined based on an orientation of the device relative to the audio source, the audio source being pre-registered with the device, wherein determining the one or more operating conditions based on the orientation of the device relative to the audio source comprises:
determining whether a time delay between times of arrival of the operation input at the two or more audio sensors of the device corresponds to one direction from among a set of predetermined directions, the time delay being determined based on the orientation of the device relative to the audio source, and the operation input being a command.

8. The method as claimed in claim 7, wherein facilitating the selection of the mode of operation comprises:
facilitating the selection of the first mode on determining that a time delay associated with the operation input corresponds to the one direction from among the set of predetermined directions, the set of predetermined directions being associated with the orientation of the device relative to the audio source, and
facilitating the selection of the second mode on determining that the time delay associated with the operation input does not correspond to a direction from the set of predetermined directions.

9. The method as claimed in claim 7, wherein the time delay being determined based on the orientation of the device relative to the audio source comprises determining positions or locations of the two or more audio sensors of the device relative to the audio source.

10. A method comprising:
determining one or more operating conditions of a device, wherein the one or more operating conditions are determined based on environmental conditions associated with the device, and wherein determining the one or more operating conditions based on the environmental conditions comprises comparing a motion level associated with the device with a predetermined threshold level of motion; and
facilitating selection of a mode of operation of the device from at least a first mode and a second mode based on the one or more operating conditions of the device,
wherein in the first mode, the device is configured to detect an operation input from an audio source based on two or more audio sensors of the device, and
wherein in the second mode, the device is configured to detect the operation input based on at least one of the two or more audio sensors and at least one non-audio sensor of the device,
wherein facilitating the selection of the mode of operation comprises performing one of:
facilitating the selection of the first mode on determining the motion level associated with the device being less than the predetermined threshold level of motion; or
facilitating the selection of the second mode on determining the motion level associated with the device being greater than or equal to the predetermined threshold level of motion.

11. The method as claimed in claim 10, wherein determining the one or more operating conditions based on the environmental conditions comprises comparing an ambient noise level with a predetermined threshold level of noise and a motion level associated with the device with a predetermined threshold level of motion.

12. The method as claimed in claim 11, wherein facilitating the selection of the mode of operation comprises performing one of:
facilitating the selection of the first mode on determining the ambient noise level associated with the device being less than the predetermined threshold level of noise and the motion level being less than the predetermined threshold level of motion; and
facilitating the selection of the second mode on determining the ambient noise level associated with the device being greater than or equal to the predetermined threshold level of noise and the motion level being greater than or equal to the predetermined threshold level of motion.

13. An apparatus comprising:
at least one processor; and
at least one memory comprising computer program code, the at least one memory and the computer program code configured to, with the at least one processor, cause the apparatus to:
determine one or more operating conditions of a device; and
facilitate selection of a mode of operation of the device from at least a first mode and a second mode based on the one or more operating conditions of the device,
wherein in the first mode, the device is configured to detect an operation input from an audio source based on two or more audio sensors of the device, and
wherein in the second mode, the device is configured to detect the operation input from the audio source based on at least one of the two or more audio sensors and at least one non-audio sensor of the device,
wherein the apparatus is further caused at least in part to determine the one or more operating conditions based on an orientation of the device relative to the audio source, the audio source being pre-registered with the device,
wherein to determine the one or more operating conditions based on the orientation of the device relative to the audio source, the apparatus is further caused at least in part to:
determine whether a time delay between times of arrival of the operation input at the two or more audio sensors of the device corresponds to one direction from among a set of predetermined directions, the time delay being determined based on the orientation of the device relative to the audio source, and the operation input being a command.

14. The apparatus as claimed in claim 13, wherein to facilitate the selection of the mode of operation, the apparatus is further caused at least in part to:
facilitate the selection of the first mode on determining that the time delay associated with the operation input corresponds to the one direction from among the set of predetermined directions, the set of predetermined directions being associated with the orientation of the device relative to the audio source, and
facilitate the selection of the second mode on determining that the time delay associated with the operation input does not correspond to a direction from the set of predetermined directions.

15. An apparatus comprising:
at least one processor; and
at least one memory comprising computer program code, the at least one memory and the computer program code configured to, with the at least one processor, cause the apparatus to:
determine one or more operating conditions of a device by comparing an ambient noise level detected by at least one audio sensor of the device with a predetermined threshold level of noise; and facilitate selection of a mode of operation of the device from at least a first mode and a second mode based on the one or more operating conditions of the device, wherein in the first mode, the device is configured to detect an operation input from an audio source based on two or more audio sensors of the device, and wherein in the second mode, the device is configured to detect the operation input based on at least one of the two or more audio sensors and at least one non-audio sensor of the device.

16. The apparatus as claimed in claim 15, wherein the apparatus is further caused at least in part to determine the one or more operating conditions based on an orientation of the device relative to the audio source, the audio source being pre-registered with the device.

17. The apparatus as claimed in claim 15, wherein the apparatus is further caused at least in part to determine the one or more operating conditions based on environmental conditions associated with the device.

18. The apparatus as claimed in claim 17, wherein to determine the one or more operating conditions based on the environmental conditions, the apparatus is further caused at least in part to compare a motion level associated with the device with a predetermined threshold level of motion.

19. The apparatus as claimed in claim 15, wherein the apparatus is further caused at least in part to determine the time delay based on the orientation of the device relative to the audio source by determining positions or locations of the two or more audio sensors of the device relative to the audio source.

20. An apparatus comprising:
at least one processor; and
at least one memory comprising computer program code, the at least one memory and the computer program code configured to, with the at least one processor, cause the apparatus to:

determine one or more operating conditions of a device, wherein the one or more operating conditions are determined based on environmental conditions associated with the device by comparing a motion level associated with the device with a predetermined threshold level of motion; and facilitate selection of a mode of operation of the device from at least a first mode and a second mode based on the one or more operating conditions of the device, wherein in the first mode, the device is configured to detect an operation input from an audio source based on two or more audio sensors of the device, and wherein in the second mode, the device is configured to detect the operation input based on at least one of the two or more audio sensors and at least one non-audio sensor of the device, wherein the apparatus is caused to facilitate the selection of the mode of operation by performing one of:

facilitating the selection of the first mode on determining the motion level associated with the device being less than the predetermined threshold level of motion; or facilitating the selection of the second mode on determining the motion level associated with the device being greater than or equal to the predetermined threshold level of motion.

* * * * *